Figure 1:
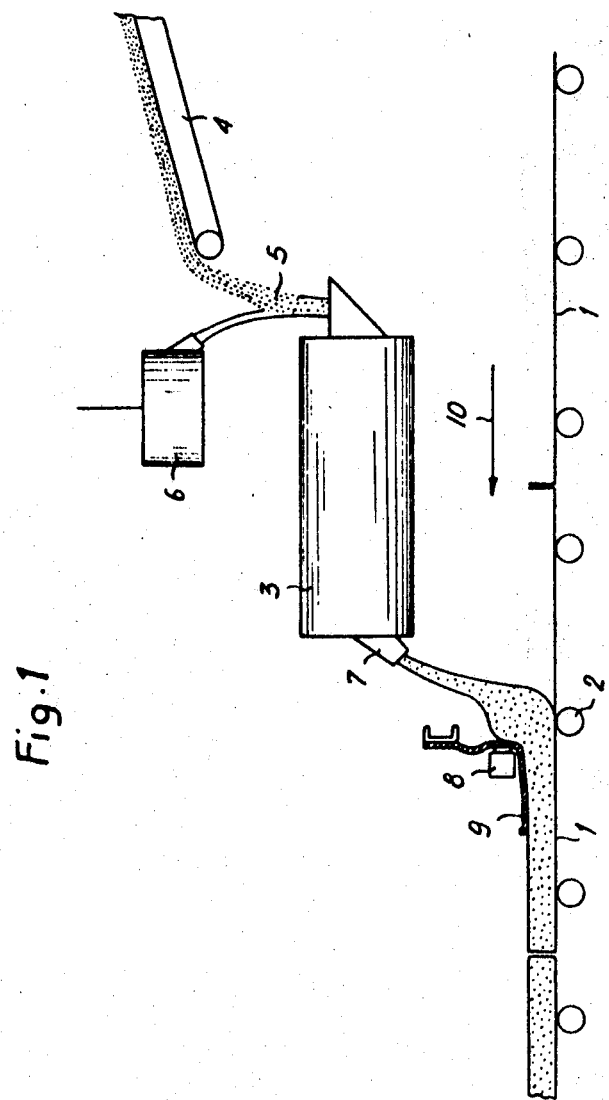

United States Patent

[11] 3,608,003

| [72] | Inventors | Hermann Klaue<br>Montreux;<br>Emil Metzger, Thayngen, both of<br>Switzerland |
|---|---|---|
| [21] | Appl. No. | 595,864 |
| [22] | Filed | Nov. 21, 1966 |
| [45] | Patented | Sept. 21, 1971 |
| [73] | Assignee | Insec Institution europiennede Credit Trust<br>Valduz, Liechtenstein |
| [32] | Priority | Nov. 20, 1965, Jan. 15, 1966, Jan. 15,<br>1966, Feb. 5, 1966 |
| [33] | | Germany |
| [31] | | K57705, K58152, K58153 and K58345 |

[54] METHOD AND APPARATUS FOR PRODUCING LIGHTWEIGHT CONCRETE PLATES
8 Claims, 9 Drawing Figs.

[52] U.S. Cl. .................................................. 264/42,
25/41, 161/162, 161/168, 264/70, 264/71
[51] Int. Cl. .................................................. B28b 1/08
[50] Field of Search ........................................ 161/159–161,
162, 168; 264/42, 70, 228, 256, 333,
71; 25/1 A, 41 J, 11, 103, 2, 154, 155

[56] References Cited
UNITED STATES PATENTS

| 1,476,938 | 12/1923 | Walper .......................... | 25/11 X |
| 2,540,354 | 2/1951 | Selden .......................... | 264/42 |
| 3,145,502 | 8/1964 | Rubenstein ..................... | 52/223 |
| 3,236,925 | 2/1966 | Urmston ........................ | 264/42 |
| 3,303,245 | 2/1967 | Trudeau ........................ | 264/256 X |
| 2,522,116 | 9/1950 | Hayes ........................... | 264/133 X |
| 3,011,938 | 12/1961 | Chapman ....................... | 161/162 UX |
| 3,055,073 | 9/1962 | Gerwick ........................ | 264/228 X |
| 3,325,341 | 6/1967 | Shannon ........................ | 161/159 X |
| 3,384,522 | 5/1968 | Rubenstein ..................... | 264/228 X |
| 3,423,492 | 1/1969 | Jonell et al. ..................... | 264/70 |

FOREIGN PATENTS

| 922,242 | 3/1963 | Great Britain ................ | 264/256 |

Primary Examiner—William A. Powell
Attorney—McGlew and Toren

ABSTRACT: In a method and apparatus for producing lightweight constructional plates by casting a mixture of filling materials and a binder into a mold, a cement and water are continuously centrifuged to form a liquid cement binder, and the binder and filling materials are continuously fed to a slowly rotating drum mixer to form the mixture. The mixture is continuously supplied to a mold while the mold is moved at a speed coordinated with a rate of mixture supply thereto to fill the mold progressively to a uniform height, while progressively subjecting only the mixture in the mold to vibration and to leveling to a uniform height. The mixture is supplied to the mold at a rate so coordinated with the rate of mold movement that the hardening reaction of the liquid cement binder just begins when the mixture is subjected to such vibration. As each mold is filled and the mixture therein vibrated, the mold is transported to a curing area and, when the cast mixture has hardened and cured, it is removed from the mold and the mold is returned for refilling. A glass fiber mat, soaked in a liquid cement, is applied to at least the under surface of the cast mixture while the mixture is being cast and before the liquid cement coating of the glass fiber mat has completely solidified. The liquid cement applied to each glass fiber mat preferably has an addition of 20 to 30 percent of natural or synthetic rubber. Each plate may have imbedded therein one or more reinforcing grids, and these reinforcing grids, as well as the glass fiber mat or mats are supplied to the mixture in the mold in a continuous manner while each mold is being filled and its mixture vibrated.

INVENTORS
HERMANN KLAUE
EMIL METZGER

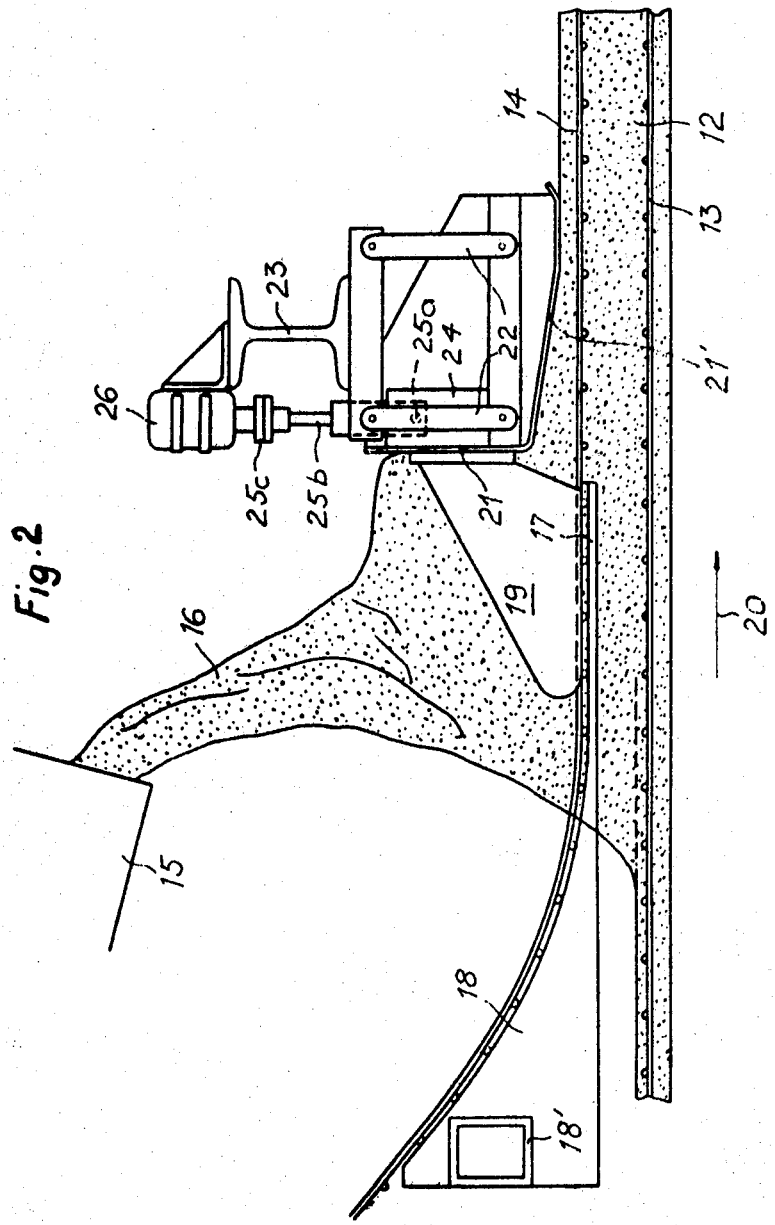

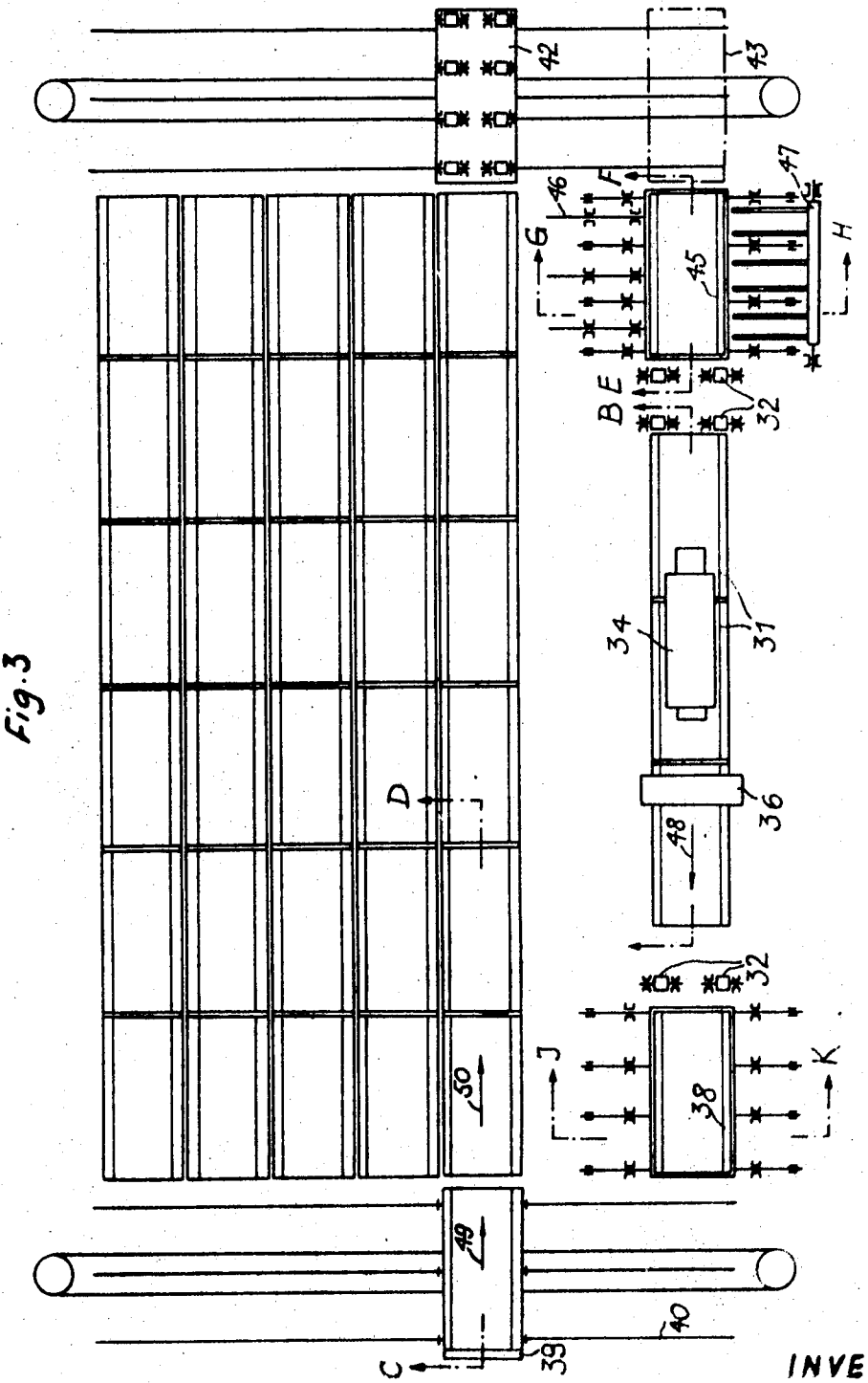

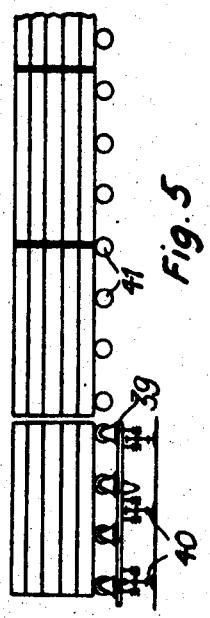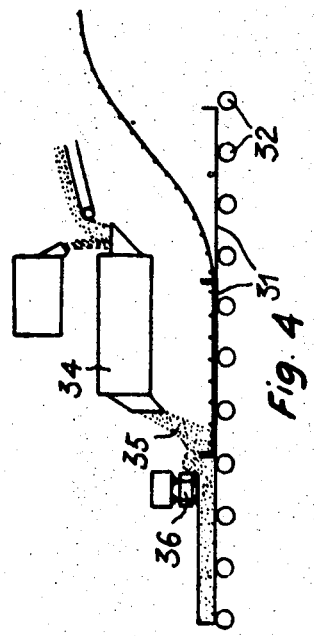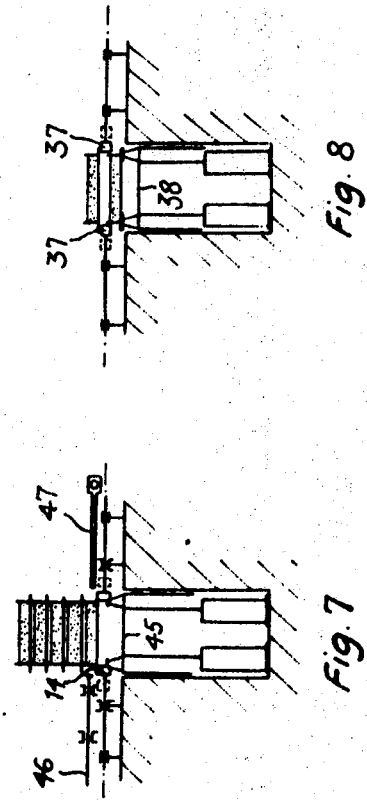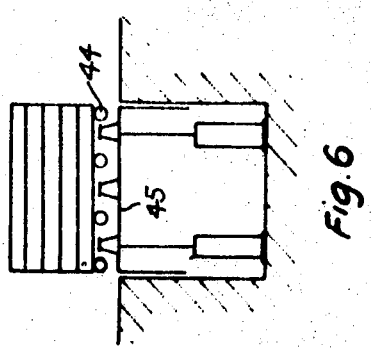

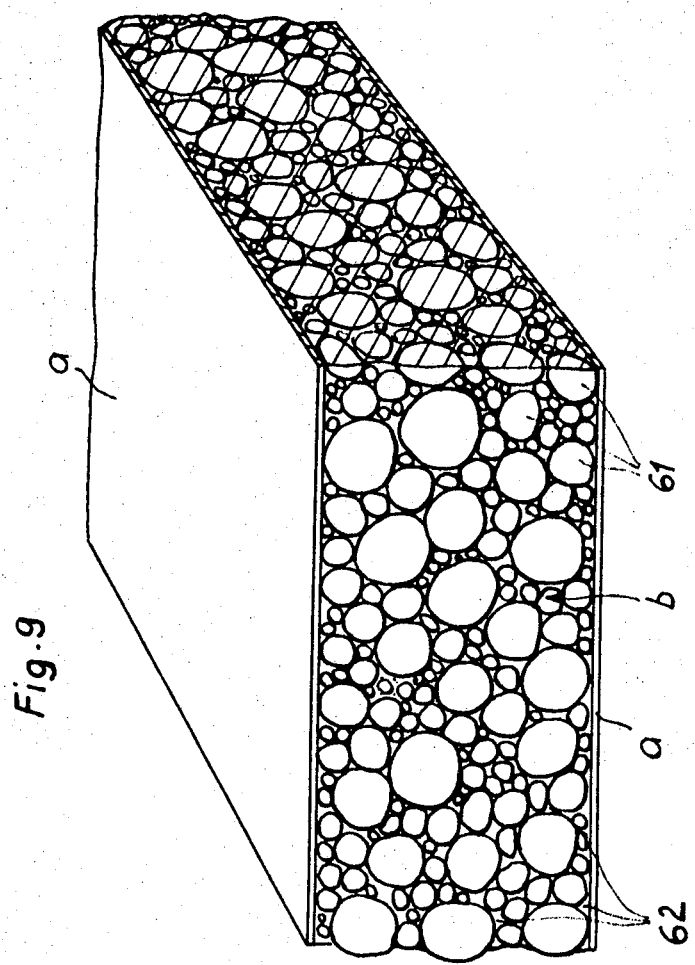

METHOD AND APPARATUS FOR PRODUCING LIGHTWEIGHT CONCRETE PLATES

BACKGROUND AND SUMMARY OF THE INVENTION

The present invention relates to a method of and apparatus for producing constructional plates made of lightweight concrete, and to a lightweight constructional plate produced therewith.

Constructional plates made of lightweight concrete have the advantage over heavy concrete plates in that they have a lower specific gravity. Lightweight construction plates were previously produced in molds, which were filled from a receptacle with the lightweight concrete (binding means, e.g. cement with, for example, a granular filler ingredient) which was previously mixed in a mixer. By shaking the mold together with its contents the material to be mixed is vibrated. The disadvantage of the previous method of production consists in that at least one complete filling of the mold, which was previously prepared by the mixer, has to be carried by the supply receptacle. Normally, several mixer fillings are necessary to fill one mold. Since a great deal of time is necessary for emptying the mixer and filling the mold with the material to be mixed, a comparatively large amount of water must be added to the material to be mixed in order to keep the latter pasty. However, in order to ensure a sufficient binding in the material to be mixed after the mold has been filled with this material, the proportion of cement must be kept greater than would have been necessary for binding the filler ingredient alone. A solidified layer of cement is thereby formed around the parts of the filling ingredient before the material to be mixed is brought into the mold. The filler components, for example, granulated particles, can therefore not be directly contacted. Since consequently, there is a relatively large space filled with cement between the filler components, a shrinkage occurs while the cement is setting, whereby cracks are formed. A further disadvantage of the loss of time from the mixing to the vibrating, consists in that the mostly porous filler components have the opportunity of absorbing humidity which according to experience can only be removed again after a long drying time.

These disadvantages are avoided or minimized according to the invention by the fact that the additional material to be mixed resulting from the above reaches the mold at such a horizontal relative speed that the material to be mixed can uniformly fill the mold, the filled material solidifying continuously at a constant relative speed to the mold.

The mixing of the prepared aggregates, consisting of filler and binding means, is advantageously effected immediately before the addition of the material to be mixed in a mixer which serves at the same time as an adding device.

Therefore, the time taken for bringing the components together can be shortened. In order to reduce the water content as much as possible, the liquid-binding means are prepared in a centrifuge in order to further intensify the mixture of the binding means, e.g. the cement with water.

By practicing this method, lightweight concrete constructional plates with a relatively small amount of binding means, which have maximum values of specific gravity, solidity and insulating effect can be produced in a very rational manner. Those constructional plates have proved to be particularly advantageous, whose cement-bound filling means is a granulate produced by expansion from silicate-containing earth. However, expanded clay can also be used as the filling means.

In order that the invention may be more clearly understood, reference will now be made to the accompanying drawings, which show some embodiments thereof by way of example and in which:

FIG. 1 is a side view of a mixture adding station for a plate-producing apparatus according to the invention, FIG. 2 shows a detailed modification of FIG. 1, shown to a larger scale, FIG. 3 is a schematic plan view of a plate-producing apparatus according to the invention, for continuous operation, FIG. 4 shows a longitudinal section through the production line shown in FIG. 3, at A-B, FIG. 5 is a longitudinal section through a transverse carriage and the maturing line, shown in FIGS. 3 at C-D, FIG. 6 is a longitudinal section through the lifting platform on the unstacking side, shown in FIG. 3 at E-F, FIG. 7 is a cross section through the lifting platform designated in FIG. 3 at G-H, FIG. 8 is a cross section through the lifting platform on the stacking side designated in FIG. 3 at J-K, and FIG. 9 is a graphic section through one part of a light constructional plate according to the invention provided on both sides with a covering layer.

Referring now to the drawings, in FIG. 1, reference 1 designates molds which follow one another continuously and which run on rollers 2. Liquid cement, which is prepared in a centrifuge 6, is filled at the same time in a revolving drum mixer 3 which is supplied with filling material 5 by means of a conveyor belt 4. The material to be mixed coming from the mixer 3 at 7 falls into the mold 1. The delivery speed of the mixer 3 and the horizontal speed of the molds 1 (moved forward by means which have not been shown) are so adapted to one another that the material, vibrated by the vibrator 8 with a vibrator 9, fills up the mold 1 to the level which was previously set by the vibrator beam 9. Arrow 10 shows the direction of movement of the molds 1 on the rollers 2.

With this new method, the production of constructional plates made of lightweight concrete can be substantially accelerated compared with the known method.

It has been shown that the removal of the finished constructional plates from the molds often brings about difficulties since the mixture slightly adheres to the base of the molds. Therefore, we have the problem of constructing the lightweight plates produced in the mold such that they can easily be removed from the mold after solidification, the surface remaining so smooth that it is not necessary to polish the sides latter when using the plate as a constructional element. According to the invention, this problem is solved by the fact that a glass fiber mat soaked in a liquid cement is placed in the mold before it is filled with the mixture, and this glass fiber mat soaked in a liquid cement is placed in the mold before it is filled with the mixture, and this glass fiber mat must previously be predried but is prepared while its liquid cement coating is being completely solidified.

In a further embodiment of the invention, a soaked and predried glass fiber mat is rollered onto the surface of the mixture after the mold has been cast and vibrated. Such a lightweight plate *b* coated on both sides with a glass fiber mat *a* is shown in FIG. 9. Attempts have already previously been made to cover constructional plates with a glass fiber layer in order to render a subsequent polishing of the plate unnecessary. Usually a suitable plastics material was used as connected means between the plate body or core and the glass fiber layer. A disadvantage of such an arrangement is the low weather resistance and the danger of the formation of cracks. In order to improve constructional plates so that no, or considerably fewer, cracks are formed, it is proposed according to the invention to soak the glass fiber layer in a liquid cement with an addition of natural or synthetic rubber before being applied to the plate body. The soaking is advantageously effected by moving the glass fiber mat over rollers which are immersed in the soaking fluid. The addition of rubber amounts to 20-30 percent of the weight of cement of the liquid cement.

As has been mentioned, in the method according to the invention, the material to be mixed, filled in the advancing molds, is continuously solidified by means of a stripping vibrator beam whose height is adjustable. In one embodiment according to the invention, such a vibrating device has a vibrator beam that serves to solidify the plate-mixture and at the same time ensures that the density tolerance of the constructional plate is maintained. In order to solve both problems at the same time, the vibrator beam arranged transversely to the direction of movement of the molds is provided according to the invention with vibratory shoes, whose masses are oscillated by vibrators secured thereto which operate mainly in the plane of production. The vibratory shoes are so hung on a fixed beam that they can be moved exclusively in the plane of production, the solidifying component being produced by the operating part of the vibratory shoe arranged diagonally to the direction of production. Hanging can be effected, for example, by means of vertical guide rods which permit a movement of the vibratory shoe parallel to the plane of production. A suitable apparatus is illustrated in FIG. 2. Arrow 20 indicates the direction of production, i.e. the direction in which the mold (which has not been shown in order to render the drawing more clear), in which the construction plate is produced, is moved. In the present example, it is assumed that the constructional plate designated by 12 has two reinforcing grids 13 and 14, grid 13 having been used to convey the reinforcing grid 14, separated previously therefrom, in the manner described in the following.

The material 16 to be mixed is conveyed from the mixing drum 15. Finger-shaped extensions 17 of the slide 18 grip in the mixture, said extensions 17 being secured to a carriage 18′ which is securely attached diagonally to the direction of movement 20 of the mold. The reinforcing grid 14 consisting of longitudinal and transverse wires, is guided away through the mixture 16 over the slide 18 at the speed at which the mold is moving. Opposite the finger-shaped extensions 17 of the slide 18 there are hung clamps 19 arranged diagonally at the same distance from one another in such a manner that the transverse wires of the reinforcing grid 14 have room to slide through the space formed between the finger-shaped extensions 17 of the slide 18 and clamps 19. The clamps 19 are securely screwed to the vibratory shoe 21. The vibratory shoe 21 for its part is hung by means of vertical guide rods 22 to the stationary vibratory beam 23 arranged diagonally to the direction 20.

The mass 24 of the vibrator is screwed fast to the vibratory shoe 21, which is connected to an electric motor 26 via a first joint 25a, a drive shaft 25b and a second joint 25c, said motor being secured to the vibratory beam 23. The lower part 21′ of the vibratory shoe is arranged diagonally to the direction 20, in order thereby to obtain the vertical solidifying component during the vibration process. The plates produced according to this method are provided with a grid reinforcement 13, 14 particularly if they are used for support walls. The reinforcing grids must be situated in the plate at a uniform depth.

In order to solve this problem and to be able to solidify the mixture around the grid without any change in position of said latter by vibrations, the upper reinforcing grid 14 is, as may be seen from FIG. 2, conveyed through the mixture in front of the vibratory shoes, the grid is guided from below through the slide 18, which engages with the finger-shaped extensions 17 in the mixture conveyed in front of the vibrator beam, and the reinforcing grid 14 is pressed thereupon via these extensions through the clamps 19. The position in height of the grid 14 in the plate is ensured by the fact that the unit consisting of vibratory shoe and clamp makes only horizontal movements during vibration. The vertical-vibratory component is, as mentioned, produced by the underside of the vibratory shoe arranged at a small angle. The clamps 19 may be in the form of discs and can be produced from sheet metal. They can also be constructed as wire clips.

In order to make the production of domestic and industrial structures cheaper, conventional materials are always being replaced by constructional plates, which are cast in large sections from heavy, gas or lightweight concrete. In order to produce these plates cheaply, it has already been proposed to produce them by casting in molds running on a roller conveyor. In order to mature the filling, the molds are left on the roller conveyor and are only removed from the molds after this. This method does not permit any continuous production of plates, since the maturing process which is being effected on the roller conveyor itself is constantly interrupting the process. In order to obviate this defect, the invention provides a method of production wherein the molds, in which the constructional plates are produced, circulate continuously, so that plates can be cast on the production line without interruption.

The method according to the invention is consequently characterized in that the molds which are continuously filled with filling ingredients on the production roller conveyor, are stacked in groups and these stacks are conveyed to drying tracks located outside the roller conveyor, where the maturing process takes place, whereupon the dried stacks of plates are brought back, unstacked and turned out of the mold at the beginning of the production roller conveyor, after which the molds are again conveyed to the latter conveyor.

The apparatus for carrying out this method which also forms the object of the invention, is characterized in that there is provided at the delivery end of the production line a stacking and transporting device for stacking the filled molds and for transporting the stacks to at least one drying track arranged outside the roller conveyor, while at the inlet end of the conveyor, a transporting and unstacking device is provided, for transporting the stacks from the drying track to the inlet end of the roller conveyor, for unstacking and emptying the molds, and for returning the empty moulds to the roller conveyor.

According to the proposal of the invention, the molds, in which the constructional plates are produced by castings, are consequently moved on a roller conveyor, the filler ingredient (possibly also reinforcing grids, a covering and base layer, etc.) is inserted into the molds, The cast constructional plates are then, however, not left on the roller conveyor but are stacked in their molds and brought, for example, by means of a transverse carriage, into drying tracks which are advantageously arranged parallel to the roller conveyor, where the stacks of plates undergo the maturing process. The ready-set, stacked plates are conveyed from the drying tracks with their molds for example, again by means of a transverse carriage, onto a lifting device and there are individually removed from the molds, after which the molds are then conveyed to the production roller conveyor. The circuit is thereby closed. The drying chamber for maturing the plates advantageously consists of a plurality of tracks. However, in case steam, for example, is used for setting purposes, the drying chamber can be replaced by a steam-heated drying tunnel when the circulation of the mold is in principle constant.

In FIGS. 3–8, the molds are designated by 31, and are continuously moved forwards on the production line consisting of individual rollers 32. In the present example, a reinforcing grid 33 is first inserted in the molds. From the continuous mixer 34, the molds 31 are provided with the substance 35. The substance 35 is solidified by the vibrator 36 in the molds 31 at the height which was previously set by the vibrator. The moulds 31, with the fresh constructional plates, are transported quickly on movable rollers 37 via a stack-lifting platform 38. By moving the lifting platform 38 upwards, pushing (or pivoting) the rollers 37 apart into the position shown in dotted lines in FIG. 8, as well as subsequently lowering the lifting platform 38 and putting the rollers 37 back into operation, a plurality of mold with the fresh plates can be stacked on one another. A stack of this type is pushed onto a transverse carriage 39 which runs on rails 40. After the transverse carriage 39 has passed in front of one of the maturing lines consisting of rollers 41, the stack with fresh construction plates is pushed into the maturing line and at the same time at the other end of the maturing line a stack with matured plates is thereby pushed onto a transverse carriage 42. After the transverse carriage 42 has passed into the position 43 (FIG. 3) the stack with the mature plates is transported on movable rollers 44 over an unstacking platform 45. After the unstacking platform 45 has been moved upwards for a short distance, the movable rollers 14 are released and are pushed (or pivoted) apart into the position shown in dotted lines. The unstacking platform 45 is lowered so far that the matured plate can be pushed out of the mold 31 onto a tipping device 47 after the parts of stamps 46 on the side of the mold (not shown in detail) have been removed. After the rollers 44 have been moved again to the original position and after the unstacking platform 45 has been lowered slightly, the empty mould 31 is again guided into the production line 32. Arrows 48, 49 and 50 indicate the circulation of the molds 31 in manufacture.

According to the described method, lightweight constructional plates can be produced from an expanded clay-cement or expanded clay-artificial resin mixture. Furthermore, it is possible to provide the surface of such plates with a covering layer of metal, plastics material or glass fiber. Such plates, to which the present invention relates, have the advantage over heavy concrete that they are much lighter and provide effective insulation against heat and sound. A disadvantage is the rough porous surface of expanded clay, which makes a comparatively large amount of water necessary for producing the plates. Moreover, the solidity of such plates is limited.

The invention also seeks to avoid these disadvantages. To this end, a granulate composed of glass particles, material containing glass particles or expanded stone can be used as the basic material for the lightweight constructional plates, which granulate is bound by means of cement or artificial resin. Glass particles can be obtained by an expansion process in a spherical shape from rough glass, which is obtained by a smelting process, for example, from quartz sand with soda. Expanded stone can be produced from vulcanically produced stone, rich in silicate, e.g. pumice or tuff by direct expansion with the aid of an expanding means, for example, with a mixture of carbon black and water glass; sandstone can also be prepared or chosen as the original product. Directly produced expanded stone has the advantage over the lighter glass particles that the granular compactness is considerably greater and this substance can be produced cheaply due to the original product appearing on the surface of the earth. Moreover, the content of alkali, which can be disadvantageous in the following binding process with cement; is considerably smaller than in glass particles.

FIG. 9 shows one part of an embodiment of a lightweight constructional plate according to the invention.

The plate body *b* formed essentially from glass particles or expanded stone granulate 61, has on both surfaces a covering layer *a* made of glass fiber, which is soaked in a solution of cement and artificial rubber before being applied. The grains 61 are bound by a binding means 62, which consists of cement or heat-setting artificial resin.

For producing the lightweight concrete mixture, a hydraulic binding means can advantageously be added when the additional material is being granulated (before the latter is expanded). The hydraulic binding means (preferably cement or cement-clinker) must correspond to the binding means used in the mortar which surrounds the additional grains, or must be bound therewith. The temperature occurring when the rough grains powdered with the hydraulic binding means are being expanded, causes the hydraulic binding means to attach or sinter fast to the grains, but is not so high (about 950° C.), that the hydraulic binding property is not lost outwardly.

We claim:

1. A method for producing lightweight constructional plates by casting a mixture of filling material and a binder into a mold, comprising the steps of mixing a silicate-containing earth with a hydraulic binder; expanding the silicate-containing earth while maintaining the binding property of the hydraulic binder constant; thereafter mixing the expanded granulate with the same hydraulic binder to form a filling material; continuously centrifuging a cement and water to form a liquid cement binder; continuously feeding the centrifuged liquid cement binder and filling material to a slowly rotating drum mixer to form said mixture; continuously supplying the mixture from the drum mixer to a mold while moving the mold horizontally at a speed coordinated with the rate of mixture supply to the mold to fill the mold progressively to a uniform height, while progressively subjecting only the mixture in the mold to vibration and to leveling to a uniform height; supplying the mixture to be molded at a rate coordinated with the rate of mold movement; thereafter hardening and curing the cast mixture in the mold; and then removing the hardened and cured constructional plate from the mold.

2. A method for producing lightweight constructional plates by casting a mixture of filling material and a binder into a mold, comprising the steps of continuously centrifuging a cement and water to form a liquid cement binder; continuously feeding the centrifuged liquid cement binder and filling material to a slowly rotating drum mixer to form said mixture; continuously supplying the mixture from the drum mixer to a mold while moving the mold horizontally at a speed coordinated with the rate of mixture supply to the mold to fill the mold progressively to a uniform height, while progressively subjecting only the mixture in the mold to vibration and to leveling to a uniform height; supplying the mixture to be molded at a rate coordinated with the rate of mold movement; thereafter hardening and curing the cast mixture in the mold; then removing the hardened and cured constructional plate from the mold; soaking a glass fiber mat in liquid-binding means; drying the soaked glass fiber mat; and placing the glass fiber mat in the mold before the mold is supplied with said mixture and while said liquid binding means has not yet set completely.

3. A method as claimed in claim 2, including the step of rolling a similarly prepared glass fiber mat onto the exposed surface of the cast mixture.

4. A method as claimed in claim 2, in which said liquid-binding means is a liquid cement having liquid rubber added thereto.

5. A method for producing lightweight constructional plates by casting a mixture of filling material and a binder into a mold, comprising the steps of continuously centrifuging a cement and water to form a liquid cement binder; continuously feeding the centrifuged liquid cement binder and filling material to a slowly rotating drum mixer to form said mixture; continuously supplying the mixture from the drum mixer to a mold while moving the mold horizontally at a speed coordinated with the rate of mixture supply to the mold to fill the mold progressively to a uniform height, while progressively subjecting only the mixture in the mold to vibration and to leveling to a uniform height; supplying the mixture to be molded at a rate coordinated with the rate of mold movement; thereafter hardening and curing the cast mixture in the mold; then removing the hardened and cured constructional plate from the mold; and inserting at least one reinforcing grid into the mold as the mold is being filled with said mixture.

6. Apparatus for producing lightweight constructional plates by casting a mixture of filling material and a binder into a mold, comprising, in combination, a stationary mixing and delivery device arranged to have continuously supplied thereto a liquid cement binder and filling materials for mixing therein; at least one mold movable past said stationary mixing and delivery device for progressively filling the mold with the mixture discharged from said device; means operable to move said mold past said mixing and delivery device horizontally at a speed coordinated with the rate of mixture supply to the mold to fill the mold progressively to a uniform height; said mixing and delivery device being slowly rotating drum on an inclined axis; conveyor means operable to supply filling material continuously to one end of said drum; a centrifuge operable to centrifuge a cement and water to form a liquid cement binder and to supply the liquid cement binder continuously to said one end of said drum; a mixture stripping vibrator immediately downstream of said mixing and delivery device and operable to level the mixture in a mold and to subject only the mixture in the mold to vibration; and a supply device adjacent said mixing delivery device and operable to lay a glass fiber mat in each mold in advance of said mixing and delivery device and in advance of filling of the mold with said mixture.

7. Apparatus as claimed in claim 6, including a second supplied device downstream of said stripping vibrator device and operable to place a second glass fiber mat onto the exposed surface of the mixture in each mold; and means operable to apply said second glass fiber mat onto such exposed surface of the mixture.

8. Apparatus for producing lightweight constructional plates by casting a mixture of filling material and a binder to a mold, comprising, in combination, a stationary mixing and delivery device arranged to have continuously supplied thereto a liquid cement binder and filling materials for mixing therein; at least one mold movable past said stationary mixing and delivery device for progressively filling the mold with the mixture discharged from said device; means operable to move said mold past said mixing and delivery device horizontally at a speed coordinated with the rate of mixture supply to the mold to fill the mold progressively to a uniform height; said mixing and delivery device being a slowly rotating drum on an inclined axis; conveyor means operable to supply-filling material continuously to one end of said drum; a centrifuge operable to centrifuge a cement and water to form a liquid cement binder and to supply the liquid cement binder continuously to said one end of said drum; a mixture stripping vibrator immediately downstream of said mixing and delivery device and operable to level the mixture in a mold and to subject only the mixture in the mold to vibration; means adjacent said mixing and delivery device operable to feed at least one reinforcing grid into each mold as the mold is being filled with said mixture.